United States Patent
Talley et al.

(10) Patent No.: US 7,107,037 B1
(45) Date of Patent: Sep. 12, 2006

(54) RESERVING CHANNEL ELEMENTS TO MAXIMIZE UTILIZATION OF RESOURCES AND PREVENT BLOCKING OF CALLS

(75) Inventors: Ryan Talley, Olathe, KS (US); Bret D. Vondemkamp, Overland Park, KS (US); Scott D. Boxberger, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 336 days.

(21) Appl. No.: 10/445,133

(22) Filed: May 23, 2003

(51) Int. Cl.
*H04Q 7/20* (2006.01)
(52) U.S. Cl. ..................................... 455/400; 455/426.1
(58) Field of Classification Search ................ 455/400, 455/426.1
See application file for complete search history.

(56) References Cited

U.S. PATENT DOCUMENTS

| | | | |
|---|---|---|---|
| 4,870,408 A * | 9/1989 | Zdunek et al. | 370/341 |
| 5,978,368 A * | 11/1999 | Hjelm et al. | 370/347 |
| 6,144,646 A | 11/2000 | Bohlmann et al. | 370/311 |
| 6,144,856 A * | 11/2000 | Ko | 455/436 |
| 6,151,512 A | 11/2000 | Chheda et al. | 455/562 |
| 6,278,882 B1 | 8/2001 | Choi | 455/453 |
| 6,377,572 B1 | 4/2002 | Dolan et al. | 370/355 |
| 6,501,737 B1 * | 12/2002 | Mathal et al. | 370/252 |
| 6,519,456 B1 | 2/2003 | Antonio et al. | 455/442 |
| 6,522,660 B1 * | 2/2003 | Mukaihara et al. | 370/443 |

* cited by examiner

*Primary Examiner*—Lester G. Kincaid
*Assistant Examiner*—Fred A. Casca

(57) ABSTRACT

Channel elements at a cell site in wireless network are managed by reserving a portion of the channel elements for handling certain types of calls for which the reserved channel elements are capable of handling. At least some of the non-reserved channel elements will typically lack the capabilities of the reserved channel elements, due to there being previous generation or older technology. For example, in a cell cite having both 3G and 2G channel elements, a percentage of the 3G channel elements, such as 15 percent, are reserved for certain types of calls, such as 3G data call origination and 3G voice hand-ins. These are types of calls that the 2G channel elements do not support. The remaining 3G channel elements are not reserved. If the non-reserved channel elements are fully utilized, the reserved channel elements may, or may not, be released for general usage so as to prevent a blocking of calls, depending on quality of service considerations for the site. The reservation of channel elements can be via a configuration parameter issued from a central management entity to base station controllers, on either a system-wide basis, or on a targeted basis to particular base station controllers.

19 Claims, 2 Drawing Sheets

RESERVING CHANNEL ELEMENTS TO MAXIMIZE UTILIZATION OF RESOURCES AND PREVENT BLOCKING OF CALLS

BACKGROUND

1. Field of the Invention

This invention relates generally to wireless communication networks and methods, and more particularly to a method of maximizing the utilization of channel element resources in a base transceiver station by reserving a percentage of next-generation channel elements for certain types of calls that cannot be performed by previous generation channel elements. The benefit of the invention is more efficient utilization of resources. It also enables the delay of purchase of next generation channel elements, and thereby allows substantial capital expenditures to be deferred.

2. Description of Related Art

In a typical cellular wireless communication system (wireless telecommunications network), an area is divided geographically into a number of cell sites, each defined by a radio frequency (RF) radiation pattern from a respective base station. The base stations of the cells are then coupled to a switching system that provides connectivity to a transport network and/or to a signaling network. When a wireless client station, such as a cellular telephone, personal digital assistant, pager, or appropriately equipped portable computer, for instance, is positioned in a cell, the client station may then communicate via an RF air interface with the base station of the cell. Consequently, a communication path can be established between the client station and the network, via the air interface, the base station and the switching system.

As a general matter, each base station (or, more generally, cell site) in the system will include a number of channel element cards that pass communications between the air interface and the switching system. Each channel element card may support transmission of communications on a number of air interface communication channels (e.g., air interface channels, whether traffic channels or control channels) at once. In turn, a wireline trunk (e.g., a T1 line) or other link will typically couple a group of channel element cards with the switching system, transporting multiple communications at once between the cell site and the switching system.

The switching system, in turn, will then typically function to control operation of the various base transceiver stations e.g., (i) controlling handoff as mobile client stations move between base stations, and (ii) controlling allocation of air interface resources. Additionally, the switching system usually functions as a transcoder, to convert the protocol of communications being passed between the air interface and downstream network elements. For instance, in a Code Division Multiple Access (CDMA) network, the air interface may carry voice signals as Enhanced Variable Rate Codec (EVRC) encoded data, while the transport network may carry voice signals as Pulse Code Modulation (PCM) encoded data. In such a network, the switching system may include a mechanism to convert between EVRC and PCM, so as to allow voice communications to pass seamlessly between the air interface and the transport network. Other examples are possible as well.

Generally speaking, the switching system may include a number of handler modules that will function to handle cell site communications, such as to perform the protocol conversion function noted above for instance. The handler cards may then be coupled to a switching processor, which functions to route communications between the handler cards and the transport network and/or signaling network. Current state of the art is this area is reflected in the following documents, all incorporated by reference herein: Ko, U.S. Pat. No. 6,144,856; Bohlman et al., U.S. Pat. No. 6,144,646; Chheda et al., U.S. Pat. No. 6,151,512; Antonio et al., U.S. Pat. No. 6,519,456; Dolan et al., U.S. Pat. No. 6,377,572. and Choi, U.S. Pat. No. 6,278,882.

Thus, in operation, communications may pass from client stations over the air interface and through cell site channel element cards, over a T1 line to the switching system. At the switching system, the communications may then pass through handler cards to the switching processor, which may then route the communications onto a transport or signaling network. Similarly, communications may pass from a network to the switching processor and in turn through protocol handler cards and over a T1 line to a cell site. At the cell site, channel element cards may then pass the communications along to the air interface, for transmission to client stations.

As wireless networking technology advances, next-generation channel elements are rolled out in base transceiver stations from time to time by channel element vendors, such as Lucent and Motorola. The next generation channel elements are installed in cell sites side by side with other channel elements of the previous generation. For example, 70 per percent of the channel elements of a particular cell site may be second generation ("2G") channel elements, and the remaining 30 percent may be third generation ("3G") channel elements.

The 3G channel elements are backwards compatible with the 2G channel elements. However, there are certain types of calls that are supported by the 3G channel elements but which are not supported by the 2G channel elements. These include 3G data calls and 3G voice hand-ins.

The present inventors have observed a marked increase in the utilization of 3G channel elements. This increase is greater than expected. Simultaneously, usage of 2G channel elements is decreasing at a rate greater than expected. As a result, without management of this phenomenon, many sites are utilizing their 3G channel elements inefficiently, by basically using 3G channel elements for functions that can be performed by 2G channel elements. In many cases, cell sites are essentially running out of 3G channel element capacity when they need it, for example for increased 3G data calls or 3G voice call hand ins. (Hand-ins of 3G voice calls can be downgraded to 2G and use a 2G channel element with a success rate of greater than 95 percent, but still this could be improved as up to 5% of the calls are dropped in this scenario.) In particular, using current techniques, if all the 3G channel elements are currently fully utilized by 2G calls and a 3G data call is originated in the cell site, the call will be blocked, while 2G channel elements, which could have handled the calls, sit idly by.

The present invention addresses this problem and provides methods and apparatus for proactively managing the utilization of the channel element resources to more efficiently use the previous and next generation equipment.

SUMMARY

In one aspect, a method is provided for managing channel elements in a wireless network. In a cell cite, a plurality of channel elements are provided, the channel elements comprising a first group of channel elements of a first type (for example, channel elements of one generation or having one set of supported features and capabilities) and a second group of channel elements of a second type (for example, channel elements of the second group being a next generation variety having an augmented set of supported features and capabilities.) The channel elements of the second group are of a more advanced generation than the channel elements of the first group, meaning that certain types of calls or processes are supported in the second group, which are not supported by the first group.

The method includes the step of reserving a portion of the channel elements of the second group for calls (or types of calls) in which the second group of channel elements are capable of handling but which the first group of channel elements are not capable of handling. For example, a certain percentage (e.g., 15%) of the channel elements in the second group are reserved for data calls which are not supported by the first set of channel elements.

At least some of the calls that are designed to be handled by the reserved channel elements are handled by those channel elements, thereby freeing up the unreserved channel elements for general usage. In the 2G and 3G embodiment, 3G data calls originating in the cell site are referred to the reserved 3G channel elements. Similarly, the effect of the reservation is that the 2G call are handled primarily by the 2G channel elements since the 3G channel elements are reserved, at least in part, for 3G calls for which the 2G channel elements cannot handle.

The reservation of the channel units can take place using a variety of techniques. In a preferred embodiment, a central network management entity or controller accomplishes the reservation by assigning a value to one or more configuration parameters and sending the parameters over a control channel to a separate controller that physically manages the channel elements in a given cell site. The configuration parameter(s) could be issued system wide, that is, to all of the channel element controllers in a particular wireless network, so that every cell site has the same reservation of channel elements. Alternatively, the configuration parameters could be targeted to specific controllers, such that the reservation of channel elements changes from cell to cell. As another alternative, the reservation of channel elements could be dynamically determined based on changing call patterns in a given cell site. The reservation of channel elements may change over time as call patterns change, additional equipment is purchased, or otherwise.

Thus, in another aspect, a method of managing channel elements in a wireless network is provided, comprising the steps of providing at least one configuration parameter by which a management entity in the wireless network may reserve a portion of the channel elements at a cell site for particular types of calls, and transmitting the at least one configuration parameter from the management entity to a controller controlling the utilization of the channel elements at the cell site, and responsively reserving the portion of the channel elements.

In one possible embodiment, the channel elements are controlled and managed by a base station controller. In another aspect of the invention, an improvement to a base station controller for a wireless network is provided. The base station controller comprises a central processing unit and software providing management functions for channel elements in at least one base transceiver station linked to the base station controller. The improvement comprises providing additional software in the base station controller that includes instructions for processing one or more parameters reserving a portion of the channel elements for particular types of calls received at the base transceiver station and responsively reserving the portion of channel elements as indicated by the configuration parameter(s).

The management of channel element resources can be extended to any situation where channel elements of different generations are deployed in a given base transceiver station; it is applicable beyond the 2G and 3G channel elements situation described above. Similarly, the types of calls for which one generation of channel elements is reserved is not particularly important; i.e., it is not limited to 3G data calls or 3G voice hand-ins. While the 3G and 2G situation and the problem of 3G data calls and 3G voice hand-ins is currently of prime importance, the invention provides a solution in the event that the problems described herein occur with fourth generation, fifth generation, and future generation channel elements.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
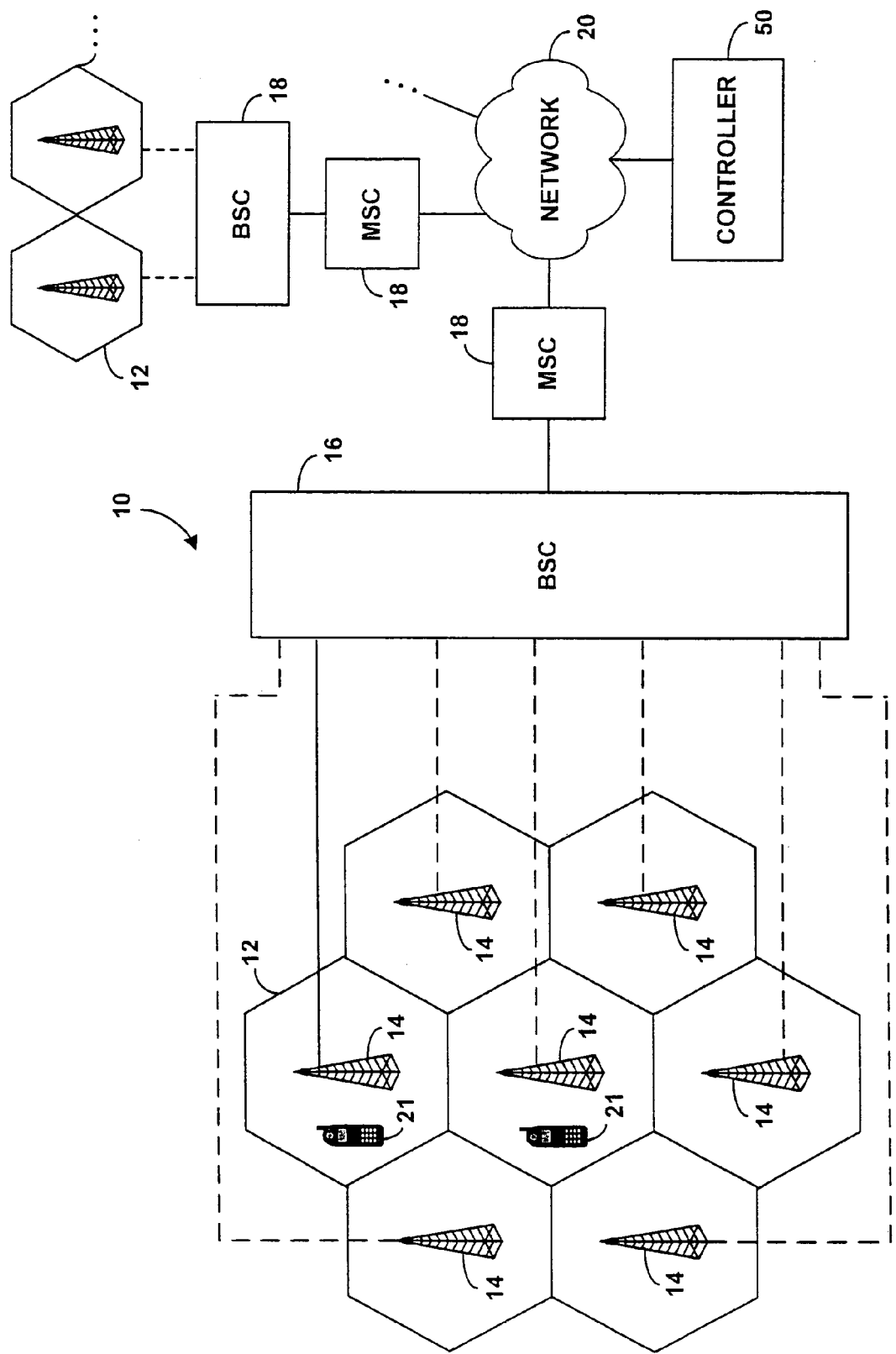
FIG. 1 is a block diagram of a wireless communication network in which the exemplary method can be employed.

Referring to the drawings, FIG. 1 illustrates a simplified block diagram of a wireless communications network 10 in which an exemplary embodiment of the present invention can be employed. The arrangements described herein are provided as examples only, and other arrangements and other elements (e.g., machines, interfaces, functions, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination and location.

As shown in FIG. 1, network 10 includes a number of cells or cell sites 12, the boundaries of which are defined by an RF radiation pattern from a respective Base Transceiver Station (BTS) antenna 14. FIG. 1 depicts each of the cells in an idealized fashion, as a hexagon that does not overlap other cells. In practice, however, most cells may overlap with neighboring cells and will vary widely in shape and size depending on terrain, type and strength of antenna, etc.

In network 10, the BTS 14 of each cell site communicates with a Base Station Controller (BSC) 16. In turn, the BSC 16 communicates with a Mobile Switching Center (MSC) 18. In one possible embodiment, the BSC 16 includes, among other things, a central processing unit (not shown) and software providing management functions for channel elements in BTSs linked to the BSC. The software is responsive to one or more channel element configuration parameters from the management controller 50, and responsively controls the reservation of channel elements in the associated BTSs, see FIG. 2. The MSC 18 communicates with a transport network 20, such as the PSTN or the Internet for instance. (Alternatively, BSC 16 may be coupled with transport network 20 via a packet data serving node ("PDSN") rather than through MSC 18. Still other arrangements are possible as well.) In operation, a mobile station 21 positioned within a cell site of network 10 can communicate via an air interface with the BTS via the channel elements in the BTS, and, in turn, with an entity on transport network 20 via the BSC 14 and the MSC 18.

Typically, the MSC 18 may serve as a general control element for network 10, being responsible for setting up and switching calls to and from the cells 12, interfacing with the transport network 20, monitoring traffic to facilitate billing, performing testing and diagnostic services, and performing other network management functions. The BSC 16, in turn, is usually responsible for managing handoff of signaling and call traffic as a mobile station moves from one cell site to another in network 10, and for controlling power levels and frequency allocations.

At each BTS, there are a number of hardware elements coupled with controlling software that provide the interface between the mobile stations and the remaining parts of the cell site. In particular, each BTS has a number of channel elements where each channel element provides hardware and software resources for controlling a communication link. Each communication link is comprised of a forward link, i.e., a link from the BTS to the mobile station, and a reverse link, i.e., a link from the mobile station to the BTS. A channel element provides functions of the forward link encoding and modulation, data symbols addition, and forward power gain adjustment. In addition, each channel element provides functions of the reverse link demodulation, frame quality determination, and reverse power control. A channel element may perform other functions. A BTS may have a number of channel elements. In a typical situation, the channel elements are implemented in circuitry and associated software in cards, each card supporting multiple channel elements of a given generation.

Channel elements per se, and BTS systems incorporating such channel elements, are known in the art and sold by telecommunications companies such as Motorola, Lucent and Samsung. Representative examples are the Lucent CDMA450 Modular Base Station and Samsung PicoBTS CDMA 2000.1X system. Representative patents directed to wireless networking and channel elements features include the patents cited previously in the Background section, the content of each of which is incorporated by reference herein. Accordingly, a more detailed description is not necessary to describe the present invention.

The BTS antenna structure sends and receives RF energy in a particular pattern that constitutes a coverage area of the cell site, usually defining several sectors. Each client station within the coverage area can then similarly send and receive RF energy so as to exchange communications with the BTS. The protocol for these communications can take various forms, examples of which include AMPS, CDMA, TDMA and GSM.

The cell site equipment, in turn, functions to interface between the antenna structure on the one hand and the switching system on the other hand. In this regard, the BTS will usually be coupled with the switching system by a landline trunk such as a T1 line, or by some other link (whether wired or wireless). Because the BTS may support wireless communications with multiple client stations at once, the cell site equipment typically functions to aggregate those multiple communications onto the link to the switching system (and vice versa for communications coming from the switching system).

In an example configuration, packetized communications pass in frame relay over a T1 line between the cell site 14 and the switch 18. Each T1 line includes 24 DS-0 (Digital Signal, level 0) channels (or "DS0s"), each of which is 64 kbps. Individual communications (whether user communications or overhead signaling) are carried between the cell site and the switch on individual "channel elements," which are effectively streams or sessions.

Each T1 line, in turn, can concurrently carry a number of communications between a cell site and a switch, in quantities or groups that may be referred to as "packet pipes." (More generally, a packet-pipe may be considered any block of communications that is sent to/from a switch or other equipment in a telecommunications network.) A given packet pipe ("PP") can have a set of characteristics, such as a number of DS0s used on the T1 line, a number of CEs carried, and an amount of bandwidth (e.g., packets per second) used on the T1 line, for instance. (Note that the term "call leg" is also sometimes used to represent the bandwidth used by a given communication. For instance, one call leg might be 100 packets per second. Also note that the amount of bandwidth used for a given CE might depend on various factors, such as on the amount of data being sent in the given CE; newer mobile phones, for instance, might provide better compression and therefore require less bandwidth for a given CE.)

It should be understood that packet pipes could take other forms as well, possibly being characterized by a set of parameters other than number of DS0s, number of CEs, and bandwidth. These characteristics are used in this description by way of example only.

In a typical arrangement, as noted above, the cell site equipment will include a set of "channel element cards" (or other equivalent modules) which define "channel elements" and which support communications over T1 links (or other such links) with the switch 18. The channel element cards may have different capacities, depending on their type. For instance, in a CDMA system, a 3G card might have capacity to support 32 channel elements, while some previous generation cards might be able to support only 10 or 20 channel elements.

Figure 2:
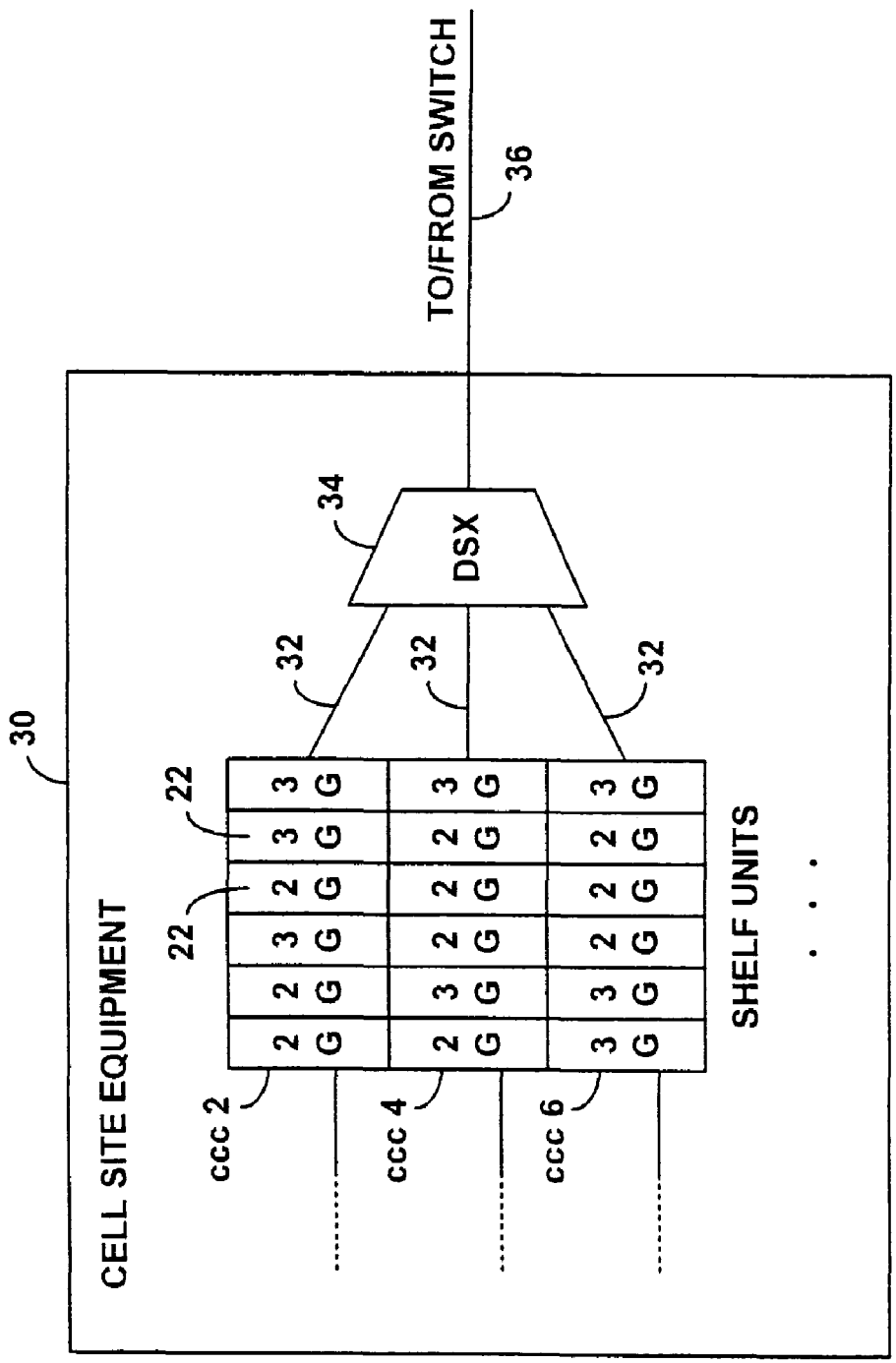
FIG. 2 is a more detailed illustration of the equipment at a cell site and the channel elements cards, which may be of different generations.

Referring to FIG. 2, for example, a block diagram of exemplary cell site equipment ("cell site") 30 is shown. Exemplary cell site 30 includes three or more shelves, designated respectively as "CCC 2", "CCC 4" and "CCC 6". And each shelf is shown to include 6 slots, which might be numbered 0 through 5. (Alternatively, the shelf unit could include a different number of shelves and/or slots.) The details on the channel elements, for example the arrangement of channel elements (CEs) in packet pipes and packet pipe termination points, is not particularly important and is omitted.

As noted above, at the present time, channel element cards 22 of FIG. 2 come in two varieties, cards that support or implement so-called "2G" channel elements (indicated as 2G in the drawings) and cards that support or implement next generation or so-called "3G" channel elements, indicated as 3G in the drawings. In some if not many cell sites, the cards are not all of the same variety. In other words, the cells may have a mix of channel element cards, some of which are 2G and some of which are 3G. This is shown in FIG. 2 by a mixture of 2G and 3G type cards 22. As noted above, each card 22 may implement a large number of individual channel elements, such as 20 or 30 CEs.

The method of this invention provides for reserving a portion (such as 15%) of all 3G channel elements in a particular cell site for (a) 3G data origination, and (b) 3G voice hand-ins. The remaining portion of the 3G channel elements can be used as before, i.e., for both 3G voice and data calls and 2G voice calls. However, with some 3G channel elements held in reserve, if the non-reserved 3G channel elements are fully occupied and a 3G data call is originated or a 3G voice hand-in occurs, one of the reserved 3G channel elements is available and is used. This will prevent unnecessary blocking of calls. Furthermore, the reserved 3G channel elements could be released for all purposes or types of calls in the event that all of the non-reserved channel elements are fully occupied, so as to prevent any dropping of communications. A Boolean configuration parameter can be assigned which governs the release of channel elements, with the assignment of YES or NO for a given cell site determined by factors such as quality of service requirements, etc.

The management of channel elements, and more precisely, the reservation of channel elements, could be done by any network management entity. In one possible embodiment, this reservation is done by a controller 50 (FIG. 1) that sends a reservation message in the form of one or more configuration parameters predefined in software, to all the BSCs in the system, which in turn, manage and reserve channel elements in their respective areas. Typically, this management entity or controller 50 would assign a value to one configuration parameter that controls the percentage of 3G channel elements that will be reserved for 3G voice hand-ins (e.g., a number less than 50 such as 10, where the number indicates a percentage of the available 3G channel elements in the site), and assign a value to a second configuration parameter that will control the percentage of 3G channel elements that will be reserved for 3G data calls, e.g., a number less than 50 such as 15, wherein the number indicates the percentage. These configuration parameters would be transmitted over a control channel to the base station controllers 16, which in turn manages the channel elements in the many base transceiver stations 14 (FIG. 1) under the supervision of the base station controller.

The management of channel element resources can be extended to any situation where channel elements of different generations are deployed in a given base transceiver station; it is obviously applicable beyond the 2G and 3G channel elements situation described above. The problem is expected to occur in future generations of channel elements as they are deployed in the field and replace older generation equipment. By managing the channel elements in this fashion, that is, by reserving channel elements as described herein, the purchase and deployment of addition next generation channel elements can be deferred. Clearly, the types of calls for which one generation of channel elements is reserved is not particularly important; i.e., it is not limited to 3G data calls or 3G voice hand-ins. As the next generation of channel elements is rolled out, different kinds of calls may need to be reserved for particular groups of channel elements, and a percentage of the channel elements of the group is reserved in accordance with the teachings herein.

The reservation of the channel units by the controller 50 could be specified in terms of absolute number of channel elements, or, more preferably, specified on a percentage basis, e.g., 15 percent. Typically, the number will be less than 50 percent. Thus, in a preferred embodiment, for a given cell site, a certain percentage of the channel elements will be reserved. The percentage of channel elements of the second group (e.g., 3G) that are reserved may vary from cell site to cell site depending on how the cell site is equipped with current and previous generation channel elements. In one possible embodiment, the reservation of channel elements could be done dynamically based on call patterns, and it may occur more than once. Alternatively, it could be a system wide reservation of a certain percentage of 3G channel elements, in order to simplify and streamline the channel element reservation process.

The management of the channel elements may take the form of configuration parameters that are defined in software, which are transmitted over a control channel from the central controller 50 (FIG. 1) to the BSCs 16. One parameter is the percentage of channel elements reserved for one type of calls (e.g., reserving 3G CEs for voice hand ins), and a second parameter for reserving channel elements for a second type of calls (e.g., reserving 3G CEs for data calls). A third parameter could be defined which controls the release of reserved channel elements depending on the utilization of the non-reserved channel elements. For example, the parameter could indicate that the BTS should release at least some of the reserved portion of the channel elements in the second group (3G CEs in the present example) when non-reserved channel elements are currently fully utilized, so as to potentially prevent a blocking of calls.

Thus, in another aspect, a method of managing channel elements in a wireless network is provided, comprising the steps of providing at least one configuration parameter by which a management entity in the wireless network may reserve a portion of the channel elements at a cell site for particular types of calls, and transmitting the at least one configuration parameter from the management node to a controller controlling the utilization of the channel elements at the cell site, and responsively reserving the portion of the channel elements.

In one possible embodiment, the channel elements are controlled and managed by a base station controller. However, the control and management of channel elements could be by some other entity.

In another aspect of the invention, an improvement to a base station controller for a wireless network is provided. The base station controller comprises a central processing unit and software providing management functions for channel elements in at least one base transceiver station linked to the base station controller. The improvement comprises providing additional software in the base station controller that includes instructions for processing a parameter reserving a portion of the channel elements for particular types of calls received at the base transceiver station and responsively reserving the portion of channel elements as indicated by the configuration parameter.

Variation from the disclosed embodiments is contemplated without departure from the scope of the invention. This scope is to be determined by reference to the appended claims.

The invention claimed is:

1. In a wireless network having a plurality of channel elements at a cell site, said channel elements comprising a first group of channel elements of a first type and a second group of channel elements of a second type, said second group capable of handling calls of a first type for which the channel elements of the first group are not capable of handling, said first and second groups of channel elements both capable of handling calls of a second type, a method of managing said channel elements of said first and second groups comprising:

reserving a portion of said channel elements of said second group for calls of said first type, and wherein said calls of said first type are preferentially referred to said reserved portion of said channel elements in said second group, and further wherein unreserved channel elements of said second group are available for handling said calls of said second type, and wherein the availability of said channel elements in said second group for handling calls of said first type is improved by virtue of said reservation of said channel elements and the preferential referral of said calls of said first type to said channel elements.

2. The method of claim 1, further comprising the step of releasing at least some of the reserved portion of the channel elements in the second group when non-reserved channel elements of said second group are currently fully utilized so as to potentially prevent a blocking of calls.

3. The method of claim 1, wherein said second group of channel elements comprise channel elements of a latest generation and wherein said first group of channel elements comprise channel elements of a previous generation.

4. The method of claim 1, wherein said reserving step is performed based on call patterns at said cell site.

5. The method of claim 4, wherein said reserving step is performed dynamically more than once based on changing call patterns at said cell site.

6. The method of claim 1, wherein the reserved portion of channel elements of said second group reserved is less than or equal to 50 percent of the total number of channel elements of the second group.

7. The method of claim 1, wherein said step of reserving further comprises the step of transmitting a configuration parameter from a management entity to a node controlling utilization of channel elements for said cell cite and responsively reserving said portion of said channel elements in said second group of channel elements.

8. A method of managing channel elements in a wireless network, comprising the steps of:
providing at least one configuration parameter by which a management entity in said wireless network may reserve a portion of the channel elements at a cell site for particular types of calls, wherein the channel elements include two groups of channel elements, including a first group and a second group, the second group of channel elements capable of calls of a first type but which said first group of channel elements are not capable of handling, said first and second groups of channel elements capable of handling calls of a second type, and wherein the reserved portion of channel elements comprises a reserved portion of the channel elements in the second group of channel elements, and
transmitting said at least one configuration parameter from said management entity to a node controlling the operation of said channel elements at said cell site; and
responsively reserving said portion of said channel elements in the second group in accordance with said configuration parameter and preferentially referring said calls of said first type to said reserved portion of channel elements in said second group;
and further wherein unreserved channel elements of said second group are available for handling said calls of said second type, and wherein the availability of said channel elements in said second group for handling calls of said first type is improved by virtue of said reservation of said channel elements and the preferential referral of said calls of said first type to said reserved portion of channel elements of said second group.

9. The method of claim 8, wherein said configuration parameter controls the percentage of channel elements of the second group that will be reserved for a particular type of call.

10. The method of claim 9, wherein said particular type of call comprises a voice hand-in.

11. The method of claim 9, where said particular type of call comprises a data call.

12. The method of claim 8, wherein said at least one parameter comprises a first parameter reserving a first percentage of said channel elements of said second group for said first type of call, a second parameter reserving a second percentage of said channel elements of said second group for a second type of call different from said first type of call, and
wherein said management entity further issues a third parameter identifying whether to release at least some of the reserved channel elements where non-reserved channels are currently fully utilized so as to potentially prevent a blocking of a call.

13. The method of claim 8, wherein said management entity further issues a parameter identifying whether to release at least some of the reserved channel elements where non-reserved channels are currently fully utilized so as to potentially prevent a blocking of a call.

14. The method of claim 9, wherein said second group of channel elements comprise channel elements of a latest generation and said first group of channel elements comprises channel elements of a previous generation, and wherein the reserved channel elements comprise channel elements of the latest generation.

15. The method of claim 8, wherein said transmitting step is performed based on call patterns at said cell site.

16. The method of claim 8, wherein said transmitting step is performed dynamically more than once based on changing call patterns at said cell site.

17. The method of claim 8 wherein said wireless network comprises a plurality of base station controllers, each of the base station controllers controlling base transceiver stations having a plurality of channel elements, and wherein the reservation of channel elements is performed for each of said base transceiver stations.

18. The method of claim 17, wherein each base transceiver station has the same percentage of channel elements reserved.

19. The method of claim 8, wherein the reserved portion is less than or equal to 50 percent of the total number of channel elements in the second group.

* * * * *